US011531933B2

(12) United States Patent
Lancioni

(10) Patent No.: US 11,531,933 B2
(45) Date of Patent: Dec. 20, 2022

(54) EXPLAINABILITY OF AN UNSUPERVISED LEARNING ALGORITHM OUTCOME

(71) Applicant: McAfee, LLC, San Jose, CA (US)

(72) Inventor: German Lancioni, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 346 days.

(21) Appl. No.: 16/826,341

(22) Filed: Mar. 23, 2020

(65) Prior Publication Data

US 2021/0295209 A1    Sep. 23, 2021

(51) Int. Cl.
*G06N 20/00* (2019.01)
*G06F 9/455* (2018.01)
*G06F 21/56* (2013.01)

(52) U.S. Cl.
CPC ............ *G06N 20/00* (2019.01); *G06F 9/455* (2013.01); *G06F 21/567* (2013.01); *G06F 2221/033* (2013.01)

(58) Field of Classification Search
CPC ........ G06N 20/00; G06N 3/088; G06N 5/045; G06F 9/455; G06F 21/567; G06F 2221/033; G06F 2009/45587; G06F 2009/45595; G06F 9/45558; G06F 21/561
See application file for complete search history.

(56) References Cited

U.S. PATENT DOCUMENTS

| 2018/0183815 | A1* | 6/2018 | Enfinger | H04L 63/145 |
| 2020/0410091 | A1* | 12/2020 | Kimon | G06F 21/566 |
| 2021/0182387 | A1* | 6/2021 | Zhu | G06F 21/554 |
| 2021/0374027 | A1* | 12/2021 | Joglekar | G06F 11/3409 |

* cited by examiner

*Primary Examiner* — Mohammad W Reza

(74) *Attorney, Agent, or Firm* — Patent Capital Group

(57) ABSTRACT

There is disclosed in one example a malware analysis server, including: a hardware platform including a processor and a memory; a machine learning model; a store of known objects previously classified by the machine learning model; and instructions encoded within the memory to instruct the processor to: receive a test sample; apply the machine learning model to the test sample to provide the test sample with classified features; compute pairwise distances between the test sample and a set of known objects from the store of known objects; select a group of near neighbor samples from the set of known objects; select a group of far neighbor samples from the set of known objects; and generate an explanation for the test sample according to the near neighbor samples and far neighbor samples.

20 Claims, 11 Drawing Sheets

EXPLAINABILITY OF AN UNSUPERVISED LEARNING ALGORITHM OUTCOME

FIELD OF THE SPECIFICATION

This application relates in general to artificial intelligence, and more particularly, though not exclusively, to a system and method for providing explainability of an unsupervised learning algorithm outcome.

BACKGROUND

Machine learning has found wide application in a variety of computing fields, including in computer security.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
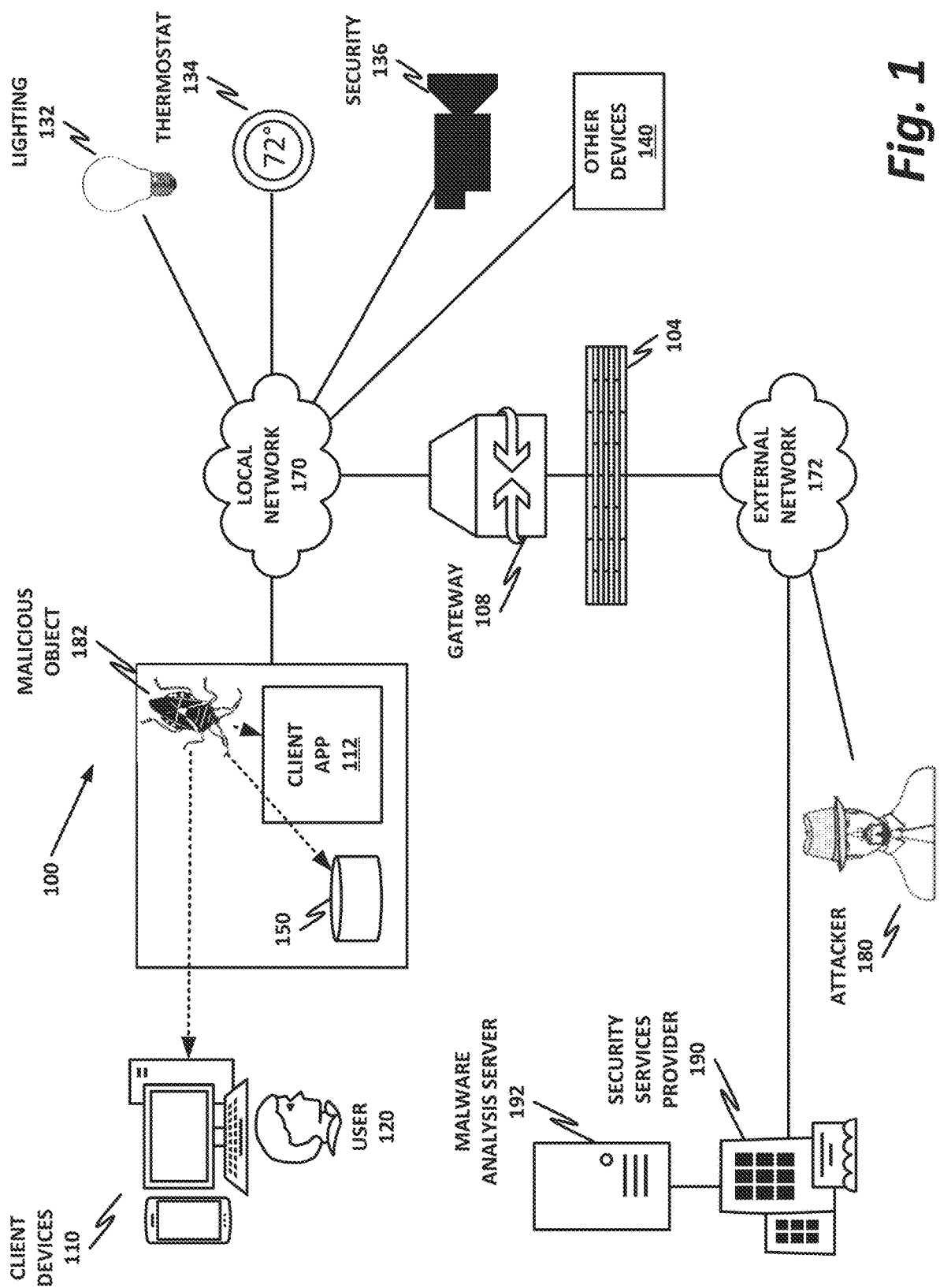
FIG. 1 is a block diagram of selected elements of a security ecosystem.

In an example there is disclosed a malware analysis server, comprising: a hardware platform comprising a processor and a memory; a machine learning model; a store of known objects previously classified by the machine learning model; and instructions encoded within the memory to instruct the processor to: receive a test sample; apply the machine learning model to the test sample to provide the test sample with classified features; compute pairwise distances between the test sample and a set of known objects from the store of known objects; select a group of near neighbor samples from the set of known objects; select a group of far neighbor samples from the set of known objects; and generate an explanation for the test sample according to the near neighbor samples and far neighbor samples.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Machine learning (ML) and artificial intelligence (AI) have found broad applicability in a number of computing disciplines. For example, machine learning can be used for content categorization, autonomous vehicles, computer security, and many other applications. Throughout the remainder of this specification, a computer security application of machine learning will be used as an illustrative and nonlimiting example. It should be understood that the disclosure herein is equally applicable to other machine learning applications that may benefit from the teachings of the present specification.

Machine learning is used in cybersecurity applications to help cope with copious volumes of data and ever-evolving cybersecurity threats. One commonly used technique is unsupervised learning (e.g., clustering). An unsupervised learning algorithm does not require label data, and therefore, it may infer conclusions based on data similarity.

An unsupervised learning algorithm reduces the object under analysis to a number of "features." For example, with a binary object, features could include the compiler used, the compiler version, the target operating system, dynamic link library (DLL) characteristics, the use of debugging application programming interfaces (APIs), sleep rules, the use of registry modification, shell use, runtime, task scheduling, and many other features. Each feature in and of itself does not necessarily identify the object as malicious or benign. For example, while it is common for malicious objects to use the Windows PowerShell and scheduled tasks, there are also many legitimate uses for the Windows PowerShell and scheduled tasks. Therefore, no one feature can mark an object as malicious or suspicious with high confidence.

However, the features in aggregate can form a more complete picture. In aggregate, malware has many different features from benignware, and different species of malware have different features from one another. For example, a Trojan may have different features from a worm, and a worm may have different features from spyware. Furthermore, even within the broad category of Trojans, there may be various families of Trojans that will share features with one another. These families of Trojans may have more in common with each other, but are still distinctive enough to be classed as different families.

An unsupervised machine learning algorithm can take an object, even in the absence of assigned labels, and reduce it to a large feature set. These features can then be compared to hundreds or thousands of other objects in an existing data set. The data set will have already been trained on existing known objects. Thus, in the training phase, when a large number of objects that are known to be Trojans cluster together, that cluster can be confidently identified as a Trojan cluster. When Trojans in different families sub-cluster within the broad cluster of Trojans, those subclusters can be identified as different families of Trojans. The cluster of Trojans will have a relatively far spatial separation from a cluster of worms. The worm cluster and the Trojan cluster will have relatively far spatial separation from a spyware cluster. The worm, Trojan, and spyware clusters will have relatively far spatial separation from each other, and from a benignware cluster.

When a new object under analysis is introduced, the unsupervised machine learning algorithm selects points within the training data set and compares the new object under analysis to each of those points. Because there may be hundreds or thousands of features, and hundreds or thousands of comparison points, it may not be practical to compare every feature for every data point. Rather, the unsupervised machine learning algorithm may select a number of "key" features for each comparison. This may be as few as three features for comparison of two different points. Note that the selected features need not be the same for each comparison. Rather, for each point, the machine learning algorithm may select what it considers to be the best available features for that comparison, and perform the comparison.

The result of these comparisons is a calculated distance from each comparison point in the training data set. This allows the new object under analysis to be clustered with other objects, by simply observing which objects have a short distance versus which objects have a long distance.

This clustering can produce a high confidence indication of what species, if any, of malware the object belongs to. Even within the larger clusters, clustering may be used to determine which specific family of a malware class the object belongs to. With this high confidence categorization of the object with a class and a subfamily, appropriate remedial action may be taken.

One challenge with this type of clustering is explainability. For example, customers and end consumers may wish to have an explanation of the algorithm's outcome. If, for example, the algorithm says that sample X is "malicious," the end consumer may want to know why the object was deemed malicious. One challenge with this approach is that conclusions are derived from a distance or similarity metric, and it is therefore sometimes difficult to explain why the classification occurred.

In the first case, explaining why includes a lot of nonintuitive math that is unlikely to give an end consumer—particularly one who is not an AI scientist—a "good feeling" about the classification. A second challenge is that explaining why in terms of the feature set can actually give away trade secrets or other intellectual property behind the algorithm. For example, the features, the methods of measuring the features, the distance metrics, and other aspects of the machine learning algorithm may be proprietary to the operator. Explaining in too much detail why the algorithm classified a particular object a particular way can actually give away these trade secrets.

It is, however, possible to explain "why," and thus meet the explainability requirement of an unsupervised learning algorithm outcome, without compromising the intellectual property involved in the system. For example, in one illustrative embodiment, a transformation mechanism translates variables (e.g., features, distance metrics, etc.) used in an unsupervised learning algorithm decision outcome to a set of "meaning groups" that can be used to explain the why of the outcome. This transformation abstracts the algorithm's decision away from the implementation details that may disclose intellectual property. This ensures that the vendor offering the service can provide customers with meaningful outcome explanations, without giving away the internals of the algorithm. This helps to protect the intellectual property, which could include, for example, which features were involved, what distance metric was employed, or the parameters of the algorithm selected.

This provides advantages relative to existing solutions that do not explain the why of an unsupervised learning algorithm outcome. In some existing cases, a solution may simply elevate the variables involved in the algorithm to the customer. However, this can be nonintuitive to a non-expert eye. For example, one existing solution is to tell the customer that the algorithm has labeled a sample as "malicious" because there is a Euclidean distance to the cluster centroid of 0.25, and the similarity metric highlights activations on categorical attributes X, Y, and Z. Two issues arise from this explanation:

The vendor may give away intellectual property of the algorithm in explaining the results, and thus provide competitors with information to copy the system. Advantageously, the present disclosure preserves the intellectual property of the algorithmic implementation. This can include, but is not limited to, the feature set being used, the distance metric being employed, and the parameters the algorithm is using to operate.

In this case, the customer does not receive a human-friendly explanation. Rather, the explanation is essentially a math-based justification using details that mean very little to the consumer in the context of a real-world application. The present disclosure provides human-friendly and meaningful explainability (the "why") for outcomes of an unsupervised learning algorithm. This can easily be directly consumed by customers who wish to have an explanation about a decision made by a machine learning algorithm.

A transformation mechanism that abstracts away sensitive variables (e.g., intellectual property) and dense mathematics into "meaning groups" can provide a human-understandable explanation, without disclosing intellectual property. In some examples, these meaning groups may use a combination of nearest neighbors versus faraway neighbors for purposes of outcome explainability.

To realize this, embodiments of the present disclosure may be applied to a system having the following characteristics:

The system implements an unsupervised learning algorithm. Given an input, this algorithm produces an outcome (prediction, classification, label, decision, etcetera).

The system is subject to a requirement to explain the outcome, for example, to customers (i.e., consumers of this solution). This solution may need to be meaningful to the consumer, but without giving away the intellectual property of the implementation of the algorithm, for example, as implemented by the vendor.

To illustrate the teachings herein, an example use case may be provided. In the example use case, an unsupervised learning algorithm is used to label a never before seen sample as "malicious" or "clean." In the case that the algorithm outcome is "malicious," the system may also be required to produce an outcome indicating what type of malware was found (e.g., Trojan, virus, worm, spyware, or other potentially unwanted program).

Based on these requirements, a test sample (TS) is submitted to the algorithm. The algorithm produces an outcome indicating that the sample is "malicious," and the sample is categorized as a "Trojan." In some cases, the sample may be further categorized as belonging to a specific family or subfamily of Trojans.

This outcome (i.e., "MALICIOUS, TROJAN, FAMILY A") is to be explained to the consumer without falling into the obvious but nonintuitive math-based explanation of how the algorithm works, what features were analyzed, what distance metric was employed, etc.

Because the algorithm deals with clusters in which samples are grouped by similarity, in one example, the system finds the top n nearest neighbor (NN) samples to test. Similarly, the system may also retrieve a number (n, or a different number) of faraway neighbor (FN) samples.

The selection of the FN samples may depend on the desired explanation. For example, if it is desirable to explain that the sample is malicious and not benign, then the FN samples may be taken from a far-removed cluster of clean data points. If it is desirable to show that the sample is a Trojan and not a worm, then the FN samples may be taken from a separate cluster of objects identified as worms. In both of these cases, the FN samples are taken from well outside the cluster that the TS belongs to.

On the other hand, if it is desirable to show that the TS belongs to Trojan family "A," then it may be desirable to take FN samples from within the same super cluster that includes clusters of Trojan families. These samples may be taken from the edge of the super cluster, or from other subclusters within the super cluster.

Thus, FN samples may be ones that are either on the edge or within the same cluster or super cluster as the sample, or they may be taken from a separate cluster or super cluster that is well-removed from the cluster containing the TS.

The top n neighbors to sample can be defined as any number of neighbors that the solution requires to provide sufficient explainability. For example, n could be equal to 10, and therefore 10 NN samples and 10 FN samples may be retrieved for explainability purposes. It should also be noted that the number of NN samples and the number of FN samples could also be different from one another. Both NN samples and FN samples may be retrieved to elaborate on explanations based on similarity and dissimilarity. For example, NN samples and FN samples may be used to explain that a "dog" is similar to a "cat" (e.g., both belonging to the super cluster of medium-sized, quadruped, furry mammals), but both are different from a bird. In this case, the cat would be a close or positive example to a dog (e.g., close and similar, but not identical). Meanwhile, a bird would be a distant or negative example.

The NN samples and FN samples may then be processed against a set of known or inferred rules into "meaning groups." A meaning group may be a high level abstraction of a group of features and values that can be used to automatically generate explanations that are useful for the consumer. These explanations can be generated without mentioning which specific features and/or values were employed in the algorithm.

A meaning group may include one or more rules that must be satisfied with a minimum match score to be considered relevant. When comparing a new TS against a neighbor sample, it is advantageous to highlight meaning groups that are highly active in both samples. For example, if both samples implement anti-debugging techniques X, Y, and Z (which can be discovered based on proprietary features and values), then the meaning group representing "evasion techniques" may contain rules that are satisfied based on a required score. If the rule of a meaning group is not satisfied (e.g., very little intersection between the two samples), then the meaning group and its rules can be discarded. In some examples, the meaning group is assigned a similarity score or percentage based on the intersection of various features. These features could be exact match features, percentage match features, or threshold match features. For example, the use of a specific compiler or compiler version may be an exact match feature. The object code was either compiled with that compiler/compiler version, or not. On the other hand, if the calculated entropy of one binary is 100 while the calculated entropy of another is 120, this does not represent an exact match, but the values are similar enough that they can be clustered together on that individual feature.

As discussed above, in computing the initial distances for cluster purposes, the machine learning algorithm may select certain features for comparison. This can reduce the number of comparisons where there is a large feature set, and also a large comparison set. But in computing a match score for explainability purposes, the number of comparison points may be relatively few. For example, 10 NN samples and 10 FN samples may be used for explainability purposes. In this case, the total number of comparisons is 20. The TS is compared to 20 other objects. Because the number of comparisons is relatively small, and because it is desirable to compare many features for explainability purposes, in this case all available features may be used. In other examples, fewer than all of the available features may be used, but the feature set reduction need not be aggressive, as it is for purposes of initial classification.

Assuming that all features are used, then the explainability module may compare every feature of the TS to every feature of each NN sample and each FN sample. The explainability module then aggregates these feature comparisons into meaning groups. For example, using exact match features as an illustration to simplify the explanation, a meaning group may contain 100 features. If the TS and an NS sample share 90 of those features in common, then there is a 90% match score between the two samples on that meaning group. This may be considered a strong match for the meaning group. For example, if the meaning group represents "forging," then a 90% match indicates that the two samples share strong forging characteristics. The scores in the aggregate for all of the NN samples (for example) can then be aggregated, for example, by averaging. This provides an aggregate average score for the NN samples that were compared to the TS. If the average score for that meaning group exceeds a threshold (e.g., 50 or 60%), then the meaning group may be included in an explainability matrix or a report provided to the consumer.

Note that in the foregoing example, exact match features were used as an illustrative example, with each feature counting as "1" for a match and "0" for a non-match. Comparison of non-exact match features may be less straightforward, and may depend on the specific feature. In general terms, the comparison between two non-exact match features may be assigned a numerical score. For example, the comparison could be assigned a score between 0 and 1, representing somewhere between a 0% match and a 100% match. For example, in comparing the entropy of object A to the entropy of object B, if object A has an entropy of 100 and object B has an entropy of 120, this may represent approximately an 83% match between the values. Thus, the value 0.83 could be encoded for that comparison. This represents, of course, only one illustrative mechanism for encoding non-exact match values, and any other suitable comparison mechanism could be used. In some cases, both exact match and non-exact match comparisons may be included in the same meaning group, in which case, it may be necessary to scale or weight values depending on importance, closeness of match, or other factors.

Similarly, aggregate comparison scores may be computed for meaning groups for the FN samples. In this case, it is expected that the correlation should be relatively low, because the FN samples are, by definition, not near neighbors to the TS. In this case, a maximum threshold may be applied to meaning groups. In other words, meaning groups may be highlighted in the explainability matrix or report only if the match score does not exceed a certain percentage. This use of a maximum match percentage is especially useful when comparing objects in the same super cluster, but in different families. In that case, the objects belonging to the same super cluster may share strong correlation in certain meaning groups, but may have low correlation in other meaning groups. Thus, the non-correlating meaning groups can be used to highlight the family difference between the groups of objects in the same cluster or super cluster.

Once all of the relevant meaning groups have been identified, the explanations for each group may be obtained. The groups may then be grouped into two categories: first, explanations belonging to the nearest samples taken from the NN samples, and second, explanations belonging to the faraway samples taken from the FN samples.

The first group may be used to explain, for example, that the TS is a Trojan like its nearest neighbors. The second group may be used to explain that the TS is not a worm or virus like its faraway neighbors, or alternatively, that the sample is a Trojan of family A, and not a Trojan of family B.

A system and method for providing explainability of an unsupervised learning algorithm outcome will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of selected elements of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Malware analysis server 192 may be operated, in one illustrative example, by security services provider 190. Malware analysis server 192 may provide a malware analysis algorithm that analyzes malware or potential malware objects to determine whether they are in fact malicious. In some cases, malware analysis server 192 may operate an unsupervised learning algorithm. An unsupervised learning algorithm is one illustrative example of malware analysis, but other algorithms could be used. In particular, many malware analysis algorithms rely on some form of neural network or machine learning algorithm. Such neural networks and machine learning algorithms may extract a feature set for the test sample that is being analyzed. This feature set can then be used to compute distances from other known samples, on a pairwise basis. This distance may be computed as an individual distance on a feature-by-feature basis, or as an aggregate distance across a plurality of features.

As discussed above, this machine learning can provide a highly accurate indication of whether an object is malicious, and how similar the object is to other objects of the same class.

However, even for an expert in machine learning, it can be difficult to parse the complex math involved on an intuitive level. So while the unsupervised learning algorithm itself may have a relatively high confidence in its scoring, a human user may have difficulty understanding why the object was so classified. And even if the human user trusts the algorithm, there is benefit in understanding why the object was classified a particular way. Thus, malware analysis server 192 may include a hardware platform that implements an algorithm such as, for example, the algorithm disclosed in FIGS. 6 and 7 of the present specification.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
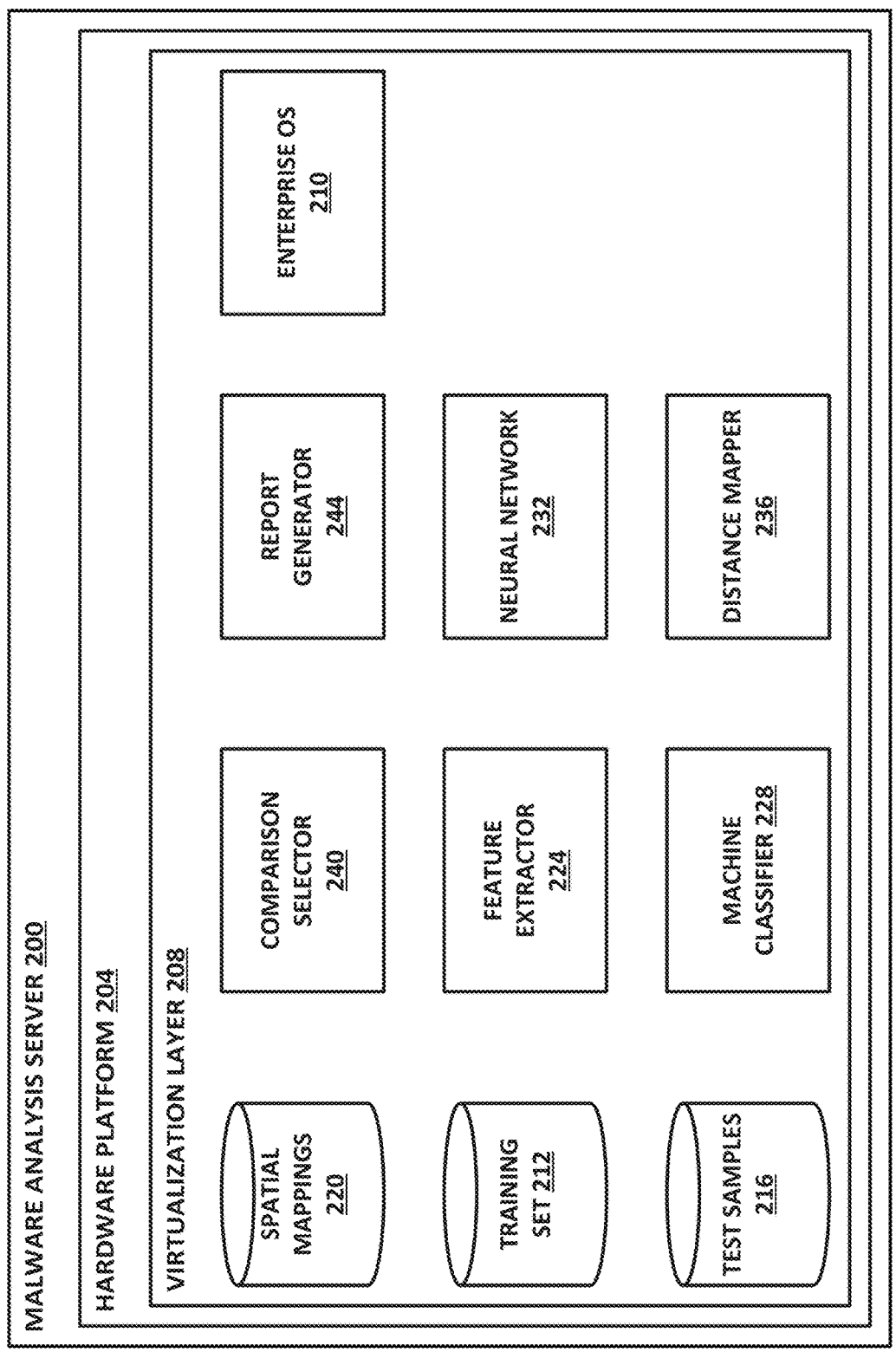
FIG. 2 is a block diagram of an illustrative malware analysis server.

FIG. 2 is a block diagram of illustrative malware analysis server 200. In this example, malware analysis server 200 is implemented on a hardware platform 204.

Malware analysis server 200 in this example operates on a hardware platform 204. Hardware platform 204 implements an algorithm such as, for example, the algorithm disclosed in FIGS. 6 and 7, below.

In this case, hardware platform 204 also operates on a virtualization layer 208. This is to illustrate that malware analysis server 200 may in fact operate in a data center, or in some other similar guest-host architecture, although this is not necessary.

Malware analysis server 200 implements a number of software functions or modules, as well as data storage. In this example, a training set 212 includes a number of known objects that have already been subjected for analysis, such as analysis by an unsupervised learning algorithm, or similar. Spatial mappings 220 stores pre-calculated spatial mappings between objects in training set 212, as well as newly calculated distances between objects in training set 212 and newly identified objects in test samples 216.

Test samples 216 stores one or more test samples, otherwise known as objects under analysis. These test samples are to be analyzed to determine whether they are malicious, and if they are malicious, why they haven't been identified as malicious.

To this end, malware analysis server 200 implements various software modules such as, for example, an enterprise operating system 210, which provides hardware support and drivers for other software modules. These additional software modules could be implemented on the same virtual machine, or they could be implemented in different virtual machines that share data, such as via a relational database with appropriate locking mechanisms, or via other signals.

The software modules include a feature extractor 224, a machine classifier 228, a neural network 232, a distance mapper 236, a comparison selector 240, and a report generator 244. These are provided by way of illustrative and nonlimiting example only. It should be understood that not all of these functions will be present in every embodiment, and that some embodiments will include other functions, as well.

By way of example, machine classifier 228 may include a feature extractor 224 to analyze test samples from test samples store 216. Features are extracted from the test samples via, for example, a neural network 232, which not only identifies the features, but in appropriate cases, also assigns weights to the features. For example, some features are a simple binary, indicating that the feature is present or not. Other features have various values, which could be enumerated values or gradated values, depending on the feature. Neural network 232 may use known machine learning algorithms to analyze test samples, extract features, and classify them according to machine classifier 228.

Once an object has been appropriately featurized and classified, a distance mapper 236 may be used to compute distances between various samples in training set 212.

In one illustrative embodiment, in a first pass, a small subset of important features are selected, and distance mapper 236 computes the distance between the test sample and all known objects in training set 212. This helps to provide a clustering of the object with other known objects. At this point, the clustering is not visibly observable by a human user, but neural network 232 can usefully predict what class of objects the test sample belongs to by mathematically observing the distance between the object and the test samples.

This can provide a high confidence prediction of whether the object is malicious, and if it is malicious, what class or subclass of malware it belongs to.

However, it may be desirable to explain why the selection was made to a human user. This can help the human user to have a high level of confidence in the prediction, and may also be useful in performing various business functions.

Report generator 244 may operate comparison selector 240 to select a group of both near neighbors and far neighbors. The near neighbors may be selected to illustrate similarity between the test sample and various objects in the training set 212. The far neighbors may be selected to illustrate the difference between the test sample and objects in training set 212.

In one example, comparison selector 240 selects near neighbors according to an algorithm that selects all neighbors (or a group of n neighbors, where n is a fixed integer) that meet a maximum distance criterion from the test sample. Similarly, far neighbors may be selected according to an algorithm that selects all neighbors (or alternatively, f neighbors, where f is a fixed integer), according to a minimum distance criterion.

The use of integers n and f in the preceding example may be selected to give a useful "snapshot" of similarity and difference, without overloading the system by computing an excessive number of neighbors. For example, f and n could both be set to 10, or to some other useful value. Furthermore, f and n need not be identical integers.

In computing the distance to the set of selected near neighbors and far neighbors, report generator 244 may not limit itself to the relatively small subset of features that are commonly used to compute gross distance for the initial identification. Rather, because the number of objects being compared is relatively small, report generator 244 may expand this to include a larger set of features, or even all available features. The expansion of the feature comparison can be used to provide a richer comparison data set that helps with the explainability of the object identification.

Report generator 244 can then generate a report that identifies the object in relation to its near neighbors and far neighbors, and that may also highlight features that are especially similar or especially different. This can help a human user to immediately see why the selected object is similar to one class or subclass, and different from another class or subclass.

Figure 3:
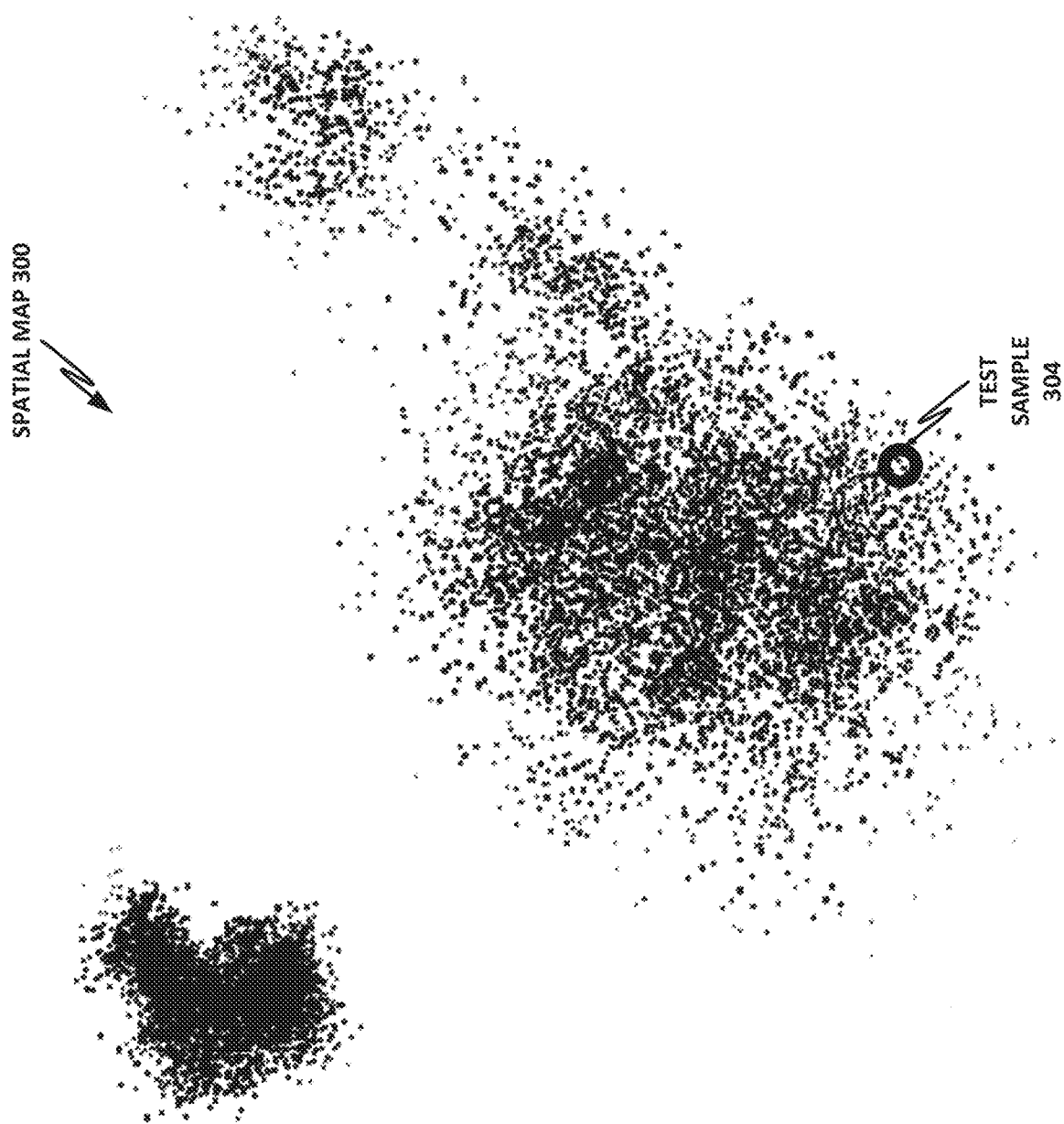
FIG. 3 illustrates an example test sample that may be stored in a test sample store.
Figure 4:
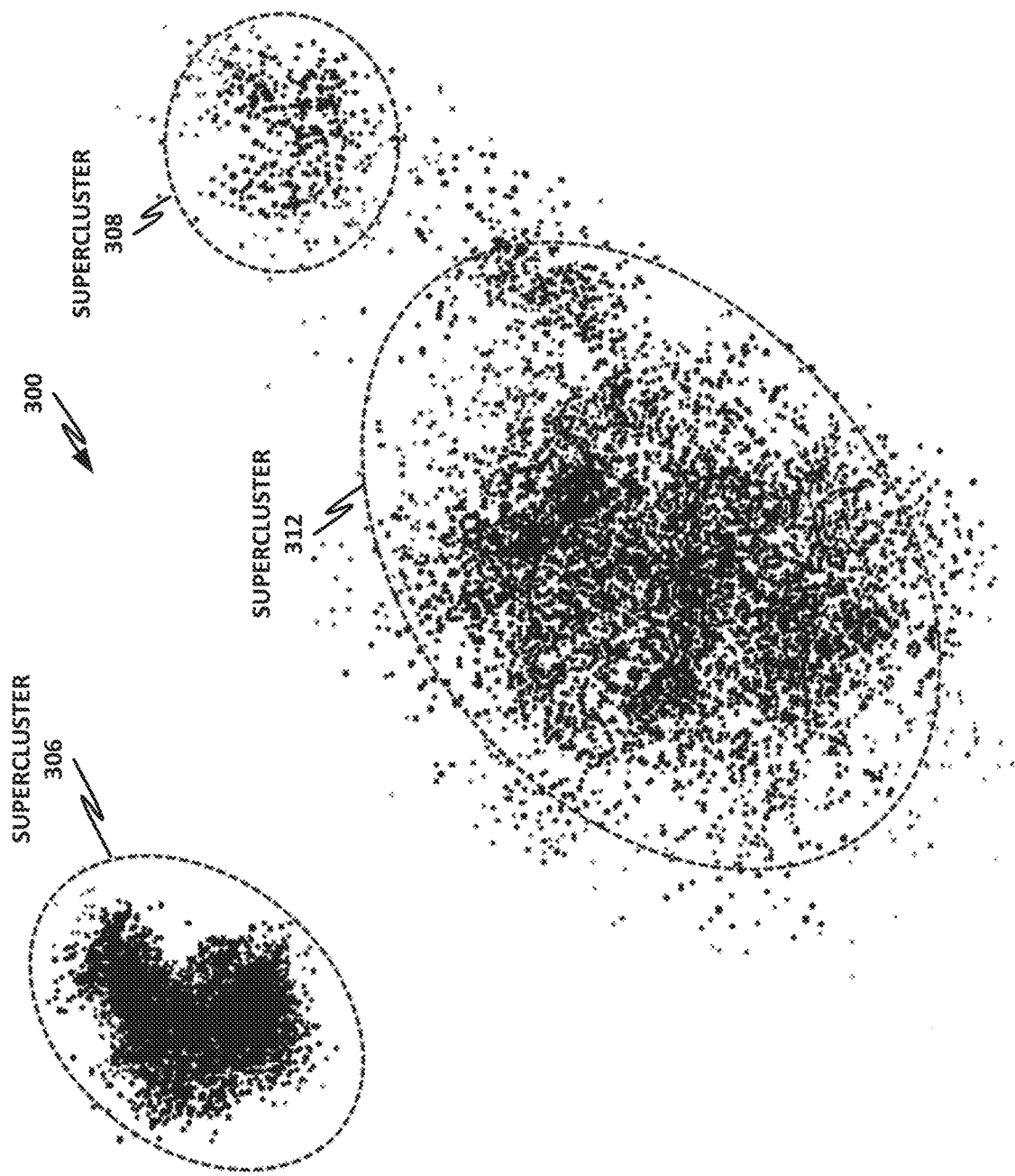
FIG. 4 illustrates an example of distance between a test sample and other objects in a spatial map.
Figure 5:
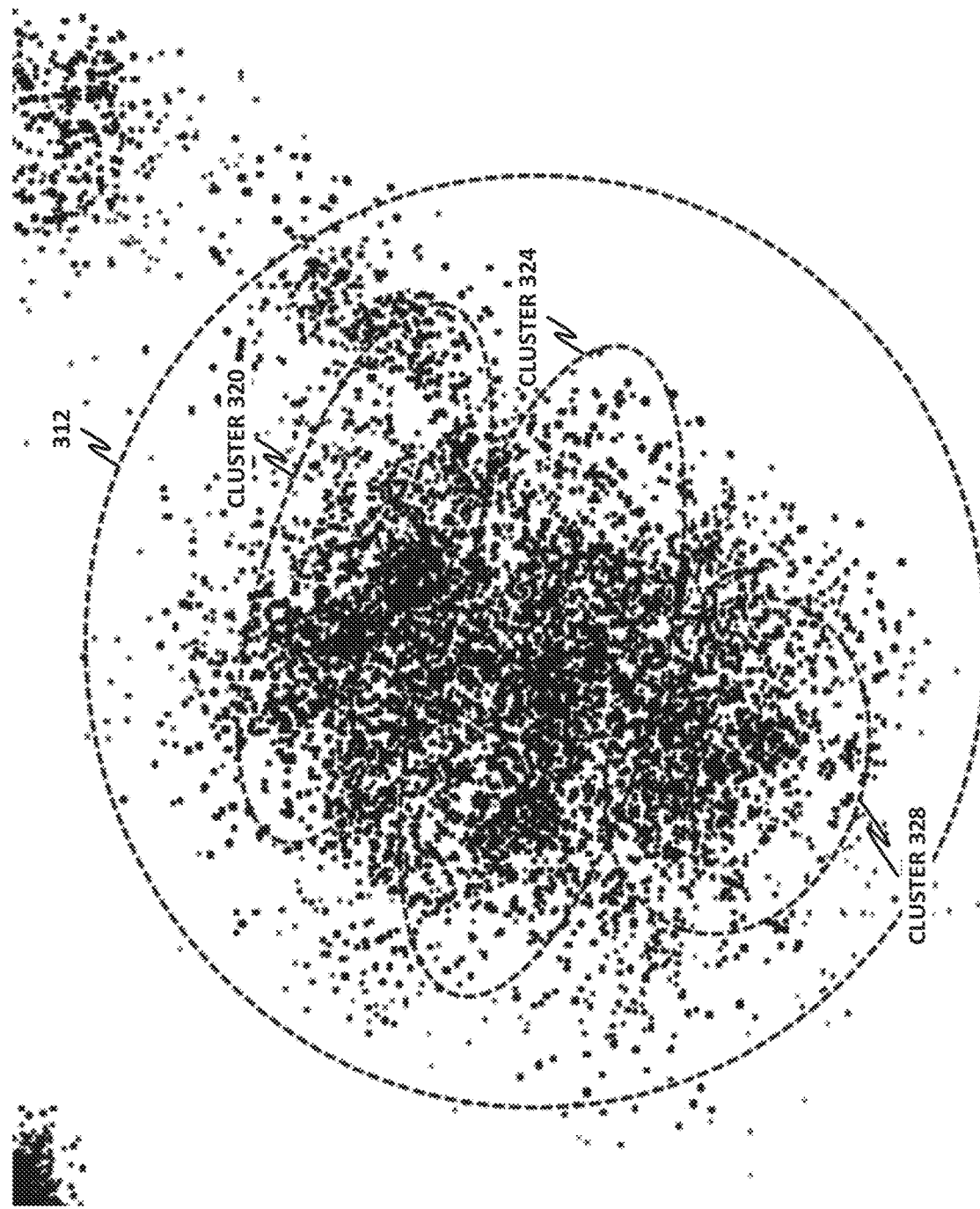
FIG. 5 is a detail view illustration of a supercluster.

FIGS. 3, 4, and 5 illustrate various aspects of a spatial map 300. For purposes of illustration, spatial map 300 appears to be a two-dimensional map of discrete points in a number of clusters and superclusters. However, this two-dimensional map is actually an expedient for purposes of this disclosure. A true spatial map 300 may actually be a three-dimensional map, or even an n dimensional map, where the number of dimensions is defined at least in part by the number features that are compared.

In security research, three-dimensional maps are commonly used. This means that there may be at least three feature comparisons between the test sample and each other sample in the training set.

As illustrated in FIG. 2, spatial mappings 220 already exist for most of the points in spatial map 300. A test sample 304 is shown specifically, and test sample 304 is used throughout FIGS. 3, 4, and 5.

The location of test sample 304 remains constant throughout FIGS. 3, 4, and 5, but so as not to clutter the illustrations, test sample 304 is outlined only in FIG. 3.

Test sample 304 may be stored in test sample store 216 of FIG. 2. A machine classifier 228 and feature extractor 224 may operate a neural network 232 on test sample 304, to extract features from and classify test sample 304. A distance mapper 236 may then compute a distance between test sample 304 and every other sample, such as samples in a training set 212. As discussed above, this may actually be a three-dimensional distance, as opposed to the two-dimensional distance illustrated in FIG. 3.

Turning to FIG. 4, the distance between test sample 304 and the other objects in spatial map 300 helps to classify test sample 304. As seen in FIG. 4, the various objects in the sample database can be generally divided into a number of clusters and superclusters. FIG. 4 illustrates a supercluster 306, in which the objects are tightly clustered, and spatially distinct from the other superclusters. Supercluster 306 may, for example, represent benign or nonmalicious objects. At least in terms of selected features that strongly correlate to malware, the objects in supercluster 306 are very similar to one another, and very different from the objects in the other clusters, namely supercluster 308 and supercluster 312.

Superclusters 308 and 312 are not as clearly defined, and there is more spread between the two. Indeed, there is a smattering of objects that clearly do not belong to supercluster 306 (in other words, they are malware), but it is difficult to cleanly assign them to one or the other of supercluster 308 and supercluster 312.

Generally, objects within superclusters may be considered to be in the same family of objects, while subclusters within the supercluster may include objects within a subfamily.

This is illustrated in FIG. 5. FIG. 5 is a detail view illustrating more particularly supercluster 312. Supercluster 312 may identify a family of malware objects. In this case, supercluster 312 can be usefully divided into a number of subsidiary clusters, namely, cluster 320, cluster 324, and cluster 328. All three clusters 320, 324, 328 belong to the same broad family of malware objects identified by supercluster 312. But, these various clusters 320, 324, 328 identify subfamilies within that broader family. Objects in these subfamilies share certain common features, and also have features that are distinct from objects in other subfamilies of the same family. However, all objects in the same broad family also share a number of similar features. Thus, supercluster 312 indicates a number of objects that are generally related, while objects within clusters 320, 324, 328 are more closely related as belonging to the same subfamily.

In generating an explainability matrix, various comparisons may be used. For example, referring to FIG. 4, a number of near neighbors from test sample 304 may be identified based on their extreme closeness to test sample 304. Once a number of near neighbors are selected, the number of feature comparisons may be expanded to include a large number of features, or even all available features.

A number of far neighbors may also be selected, based on their distance. For example, far neighbors could be selected from supercluster 308 and/or supercluster 306. These far neighbors are used as a contrast to test sample 304. By showing that test sample 304 is very different from objects in superclusters 306, 308, the explainability matrix can indicate that test sample 304 is both not benign (otherwise, it would appear in or near supercluster 306), and also, as malware, does not belong to the same large family as supercluster 308.

In some cases, it may also be useful to identify the specific subfamily. In that case, far neighbors may also be selected from within supercluster 312, but from without cluster 324. For example, far neighbors may be selected from clusters 320 and 328. This can help to further refine the explainability matrix, by illustrating with confidence that test sample 304 belongs not only to the large family of objects identified by supercluster 312, but also that it belongs specifically to the subfamily of objects identified by cluster 324, and has some meaningful differences from selected objects in clusters 320, 328.

Figure 6:
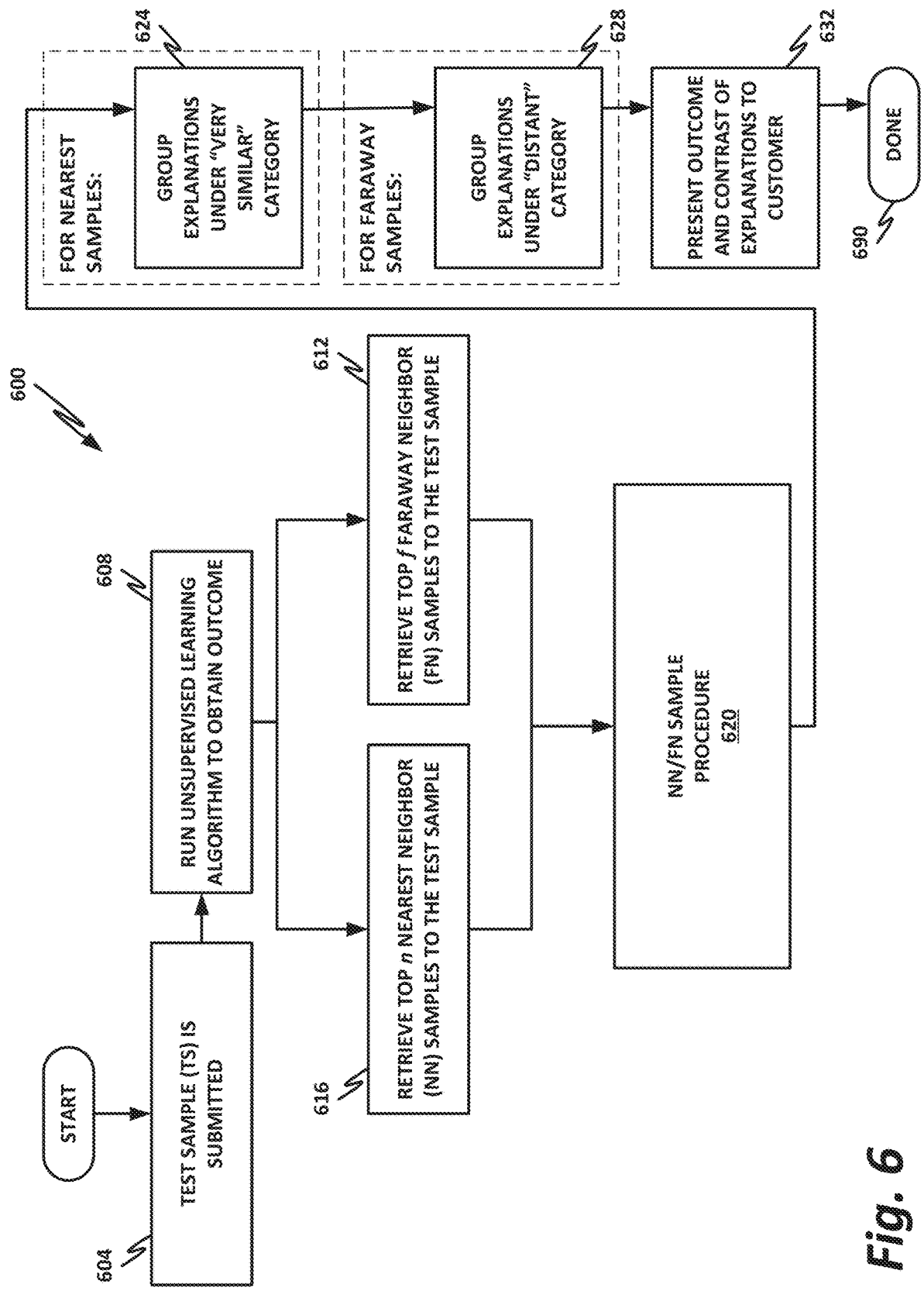
FIG. 6 is a flowchart of an example method.

FIG. 6 is a flowchart of a method 600. Method 600 represents an algorithm that may be implemented in various of the software modules or functions that are disclosed throughout the present specification.

The algorithm of method 600 is to classify a test sample, and then to generate an explainability matrix or other explainability data for the test sample. This may include creating meaning groups that are structured to hold the relationship between the intellectual property (e.g., features and values, a distance metric threshold, contextual information, hyperparameters, and similar) and the customer-facing explanations that may be derived from these groups, based on the set of rules that are satisfied based on a minimum required score.

One purpose of this score is to elevate only relevant explanations to the customer, instead of providing meaningless information when there is little match between the test sample and neighbor samples.

Starting in block 604, a test sample is submitted and is received by a malware analysis server, such as malware analysis server 192 or any of the other embodiments of a malware analysis server throughout this specification.

In block 608, the malware analysis server runs an algorithm, such as a machine learning algorithm, to classify the test sample and to assign features to it. In some examples, this could be an unsupervised learning algorithm to produce the desired outcome.

In block 612, the malware analysis server retrieves the top f far away neighbor (FN) samples to the test sample. In block 616, the malware analysis server retrieves the top n nearest neighbor (NN) samples to the test sample.

TABLE 1

Example Information in "Meaning Group" Structures

| Meaning Group | Rule(s) | Minimum Required Match Score | Explanation |
| --- | --- | --- | --- |
| Forging | Exact match of features "COMPILER", "COMPILERVERSION", "PLATFORM", "TARGETOS", "DLLCHARACTERISTICS", "PACKAGER" . . . | 90% | Samples were created using the same tools and for the same platforms, so both are aimed at the same users and systems. |
| Anti-Debugging | Exact match of features "TLSCALLBACK", "DEBUGAPI1", DEBUGAPI2", "SLEEPRULE", "HIDERULE" . . . | 50% | Both samples are trying to evade inspection, which is usually performed by security researchers during an investigation. In this case, samples share |

TABLE 1-continued

Example Information in "Meaning Group" Structures

| Meaning Group | Rule(s) | Minimum Required Match Score | Explanation |
|---|---|---|---|
| | | | x % of the same evasion techniques. |
| Dangerous Capabilities | Percent match of features "MODIFYREGTIMES", "DISABLEAUTOSTART", "SHELLUSE", "TOTALCONNECTIONS", "AVGSLEEPTIME", "AVGRUNTIME", "TOTALSCHEDULEDTASKS" . . . | 60% | Some operations such as modifying the operating system default values may be very dangerous. In this case, both samples are attempting to use more than x % of dangerous capabilities that in combination are usually an indication of malicious intent. |
| . . . | . . . | | . . . |

Table 1 above illustrates a number of rules or features that have been grouped into meaning groups, along with a minimum required match score for an NN sample.

In this example, for the "forging" meaning group, an exact match is required for a number of features such as compiler, compiler version, platform, target operating system, DLL characteristics, and packager. This indicates that the sample was created using a same toolchain on the same platform as some other, previously characterized known samples. In this case, the malware analysis server is looking for a very close match, so the minimum required match score is 90%. In other words, if there are ten features in the group, nine of them at a minimum must match exactly for this feature to be considered a near neighbor.

In the anti-debugging meaning group, a looser match is permissible. In this case, again, there are a number of exact match features, but only 50% of them need to match to be considered a match on the anti-debugging feature set.

In the dangerous capabilities meaning group, a number of percentage match features are provided. For example, these include the number of times the registry was modified, the number of times autostart was disabled, the number of times a shell was used, total connections made, average sleep time, average runtime, and total scheduled tasks. A match on this meaning group requires a modest match, meaning that an aggregate score is computed on all of the features in the meaning group, and an aggregate percentage match is computed. In some cases, certain features may be more important than other features, in which case those features may be more heavily weighted than the less important features.

This illustrates an example of what a meaning group may contain, including specifying the rule or rules that should be evaluated for the meaning group. Each meaning group may also have a minimum required match score for the rules, and an explanation that may be derived if the group is satisfied based on the matching rules. It may be observed that the explanation only provides a high level abstraction of the activation, which is useful for the customer to understand the outcome, while at the same time preserving the vendor features, values, or similar. Note that Table 1 provides only features for identifying near neighbors. In this case, near neighbors are identified according to a minimum match threshold.

In the case of FN sample selection, there may instead be a maximum match threshold, and a similar computation may be performed. The meaning groups for FN sample selection may be the same meaning groups used for NN sample selection, but instead of having a minimum match threshold, they may have a maximum match threshold. In other cases, different meaning groups could be selected for FN sample selection, with associated maximum match threshold values. The FN sample meaning groups could be selected to illustrate that the test sample belongs to a different subfamily of the family (e.g., a different cluster within the supercluster), or to illustrate that the test sample belongs to a completely different cluster or supercluster from the FN samples.

Block 620 illustrates the NN/FN sample procedure as part of the block diagram of FIG. 6. Additional details of block 620 are illustrated in FIG. 7.

Figure 7:
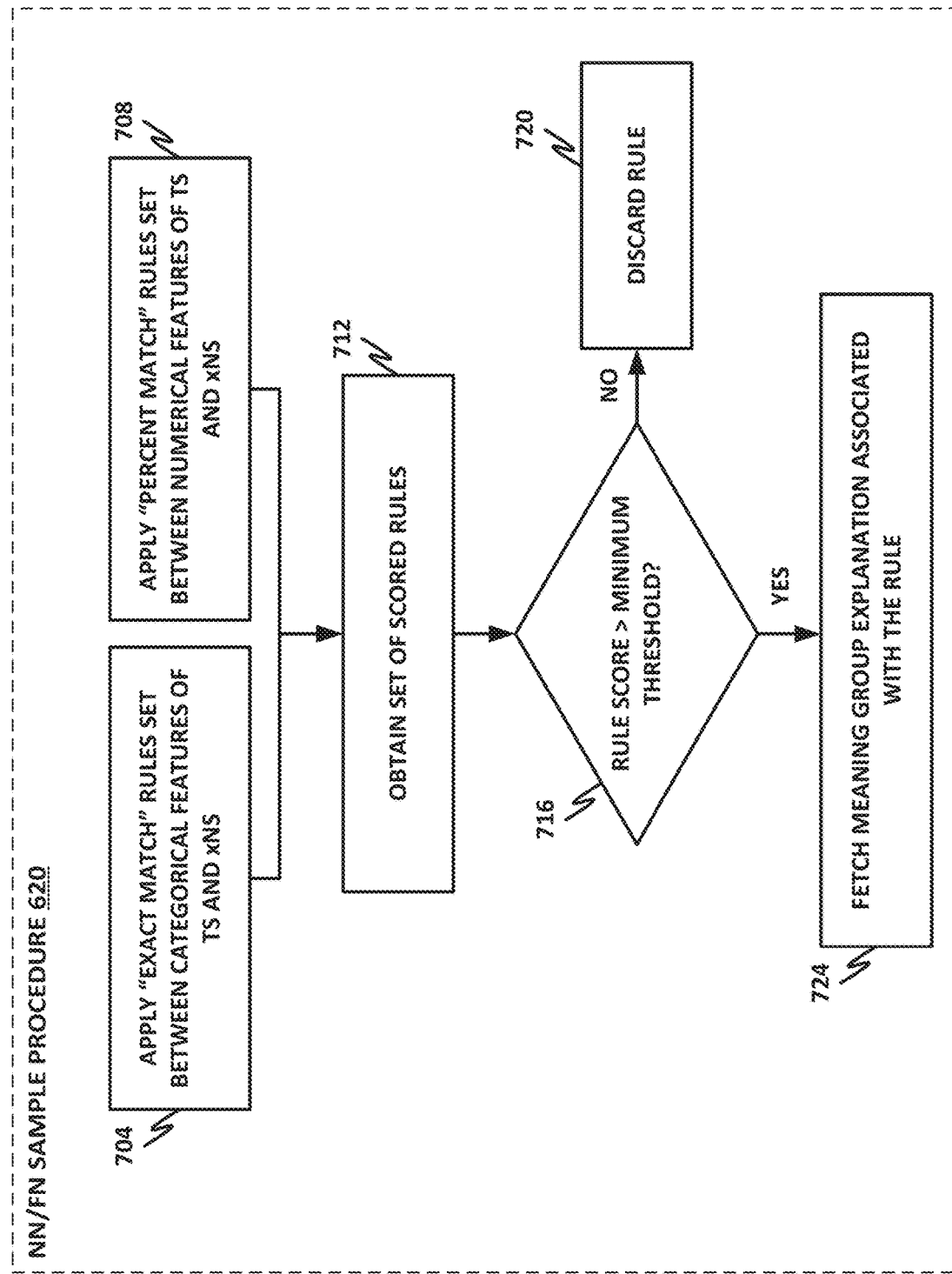
FIG. 7 is a block diagram illustration of an example near neighbor and far neighbor sample procedure.

Within block 620 of FIG. 7, blocks 704 and 708 may initially be applied in parallel, or at least the blocks do not necessarily depend on one another.

In block 704, the malware analysis server may apply an exact match rule set between categorical features of the test set and the neighbor samples (either FN or NN).

In block 708, the malware analysis server may apply a percentage match rule set between numerical features of the test sample and neighbor samples (either FN or NN).

In block 712, the malware analysis server obtains a set of scored rules, with the score representing a comparison between the test sample and a known sample. As discussed above, this could be an aggregate of all the samples, a weighted average, a percentage of exact matches, or some other appropriate weighting algorithm. There are many known algorithms for combining both similar and dissimilar data into an aggregate score, and any such algorithm could be used.

In decision block 716, the malware analysis server compares the score to a threshold. In block 716, this is shown as a minimum threshold, but this should be understood to mean a minimally acceptable threshold. In other words, for selecting a near neighbor in particular, this could be a minimum threshold, but for selecting a far neighbor, this could actually be a maximum threshold.

If the score does not meet the minimally acceptable threshold, then in block 720, the rule is discarded.

Returning to decision block 716, if the score does meet the minimally acceptable threshold, then in block 724, the system may fetch the meaning group explanation associated with that rule.

The operations of block 620 may be repeated as many times as necessary for each rule within a meaning group, and for all meaning groups. Thus, the malware analysis server may iterate through block 620 numerous times for each comparison between the test sample and a candidate neighbor sample. Although the number of comparisons in this case may be much higher than the number of comparisons used for the initial characterization of the test sample, this may be acceptable because the number of compared samples is relatively small. In the case of the entire data set, the system may be comparing the test sample to hundreds or thousands of samples. In the case of block 620, there may be on the order of tens of objects to compare to.

In block 624, following the FN/NN sample procedure of block 620, the malware analysis server finds the nearest samples, and groups explanations under the "very similar" category.

In block 628, for the FN samples, the malware analysis server groups explanations under the "distant" category.

In block 632, the malware analysis server presents outcome and contrast explanations to the end user.

In block 690, the method is done.

The result of this execution pipeline is a produced outcome. The outcome produced by the unsupervised learning algorithm can be augmented with an explainability metric, an explainability optic, an explainability matrix, or some other explainability data. Not only are the explainability data more intuitively understandable for a human user, but they can be safely presented to a customer or consumer of the system without the risk of compromising intellectual property or trade secrets.

Table 2 below illustrates an example explainability matrix that could be delivered to a customer to provide explainability for a malware categorization.

TABLE 2

Unsupervised Learning Algorithm Outcome
Augmented With Customer-Facing Explainability
Test Sample (TS) algorithm outcome:
"MALICIOUS", "TROJAN" Why?

As derived from near neighbor (NN) samples, because TS looks very similar to "Trojan" samples that:
Exhibit the same TS resources structure.
Were created using the same tools and for the same platforms, so both are aiming for the same users and systems.
Are trying to evade inspection, which is usually performed by security researchers during an investigation. In this case, samples share 60% of the same evasion techniques.
Exhibit 58% of TS directories structure.
And, as derived from far neighbor (FN) samples, because TS looks distant to "Virus" samples in which:
They match less than 25% on entry characteristics.
They don't share more than 25% image characteristics.
Section characteristics are significantly different, sharing only 18% of them.

Figure 8:
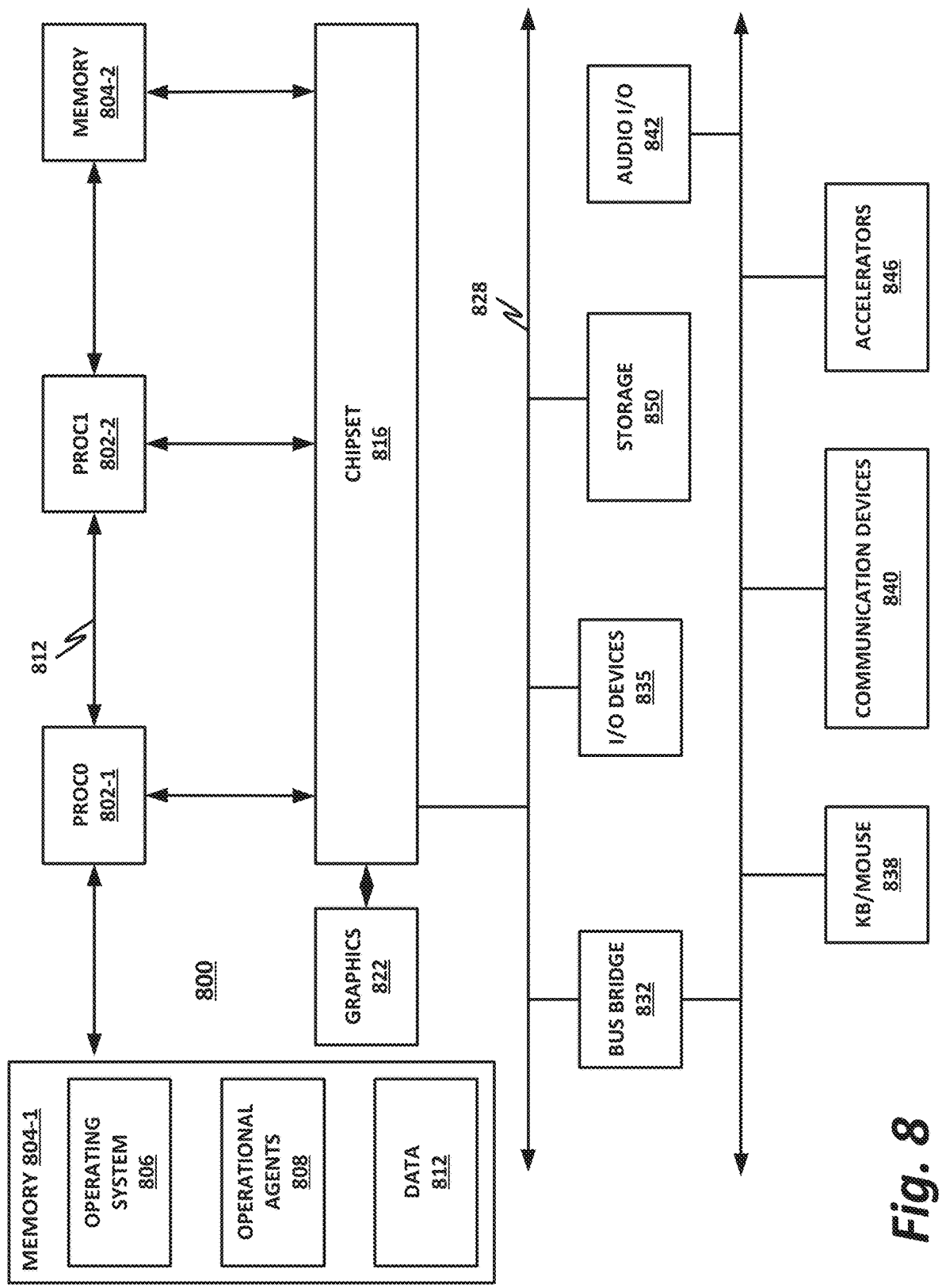
FIG. 8 is a block diagram of selected elements of a hardware platform.

FIG. 8 is a block diagram of a hardware platform 800. In at least some embodiments, hardware platform 800 may be configured or adapted to provide explainability of an unsupervised learning algorithm outcome, and may also implement any of the algorithms disclosed herein.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
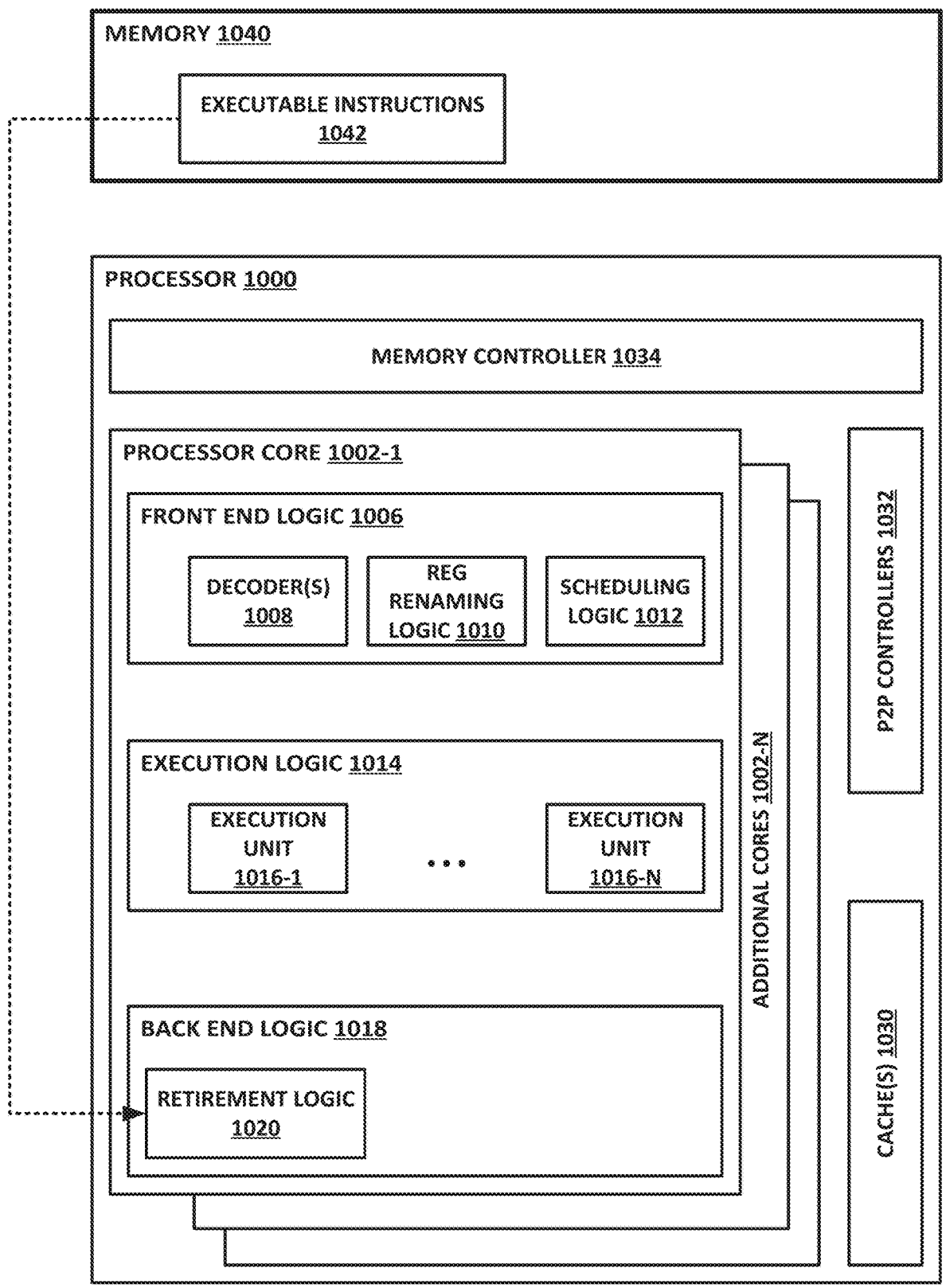
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPUs).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency non-volatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, accelerators 846, and/or a data storage device 850. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory, computer readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on operating system 806, or operating system 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
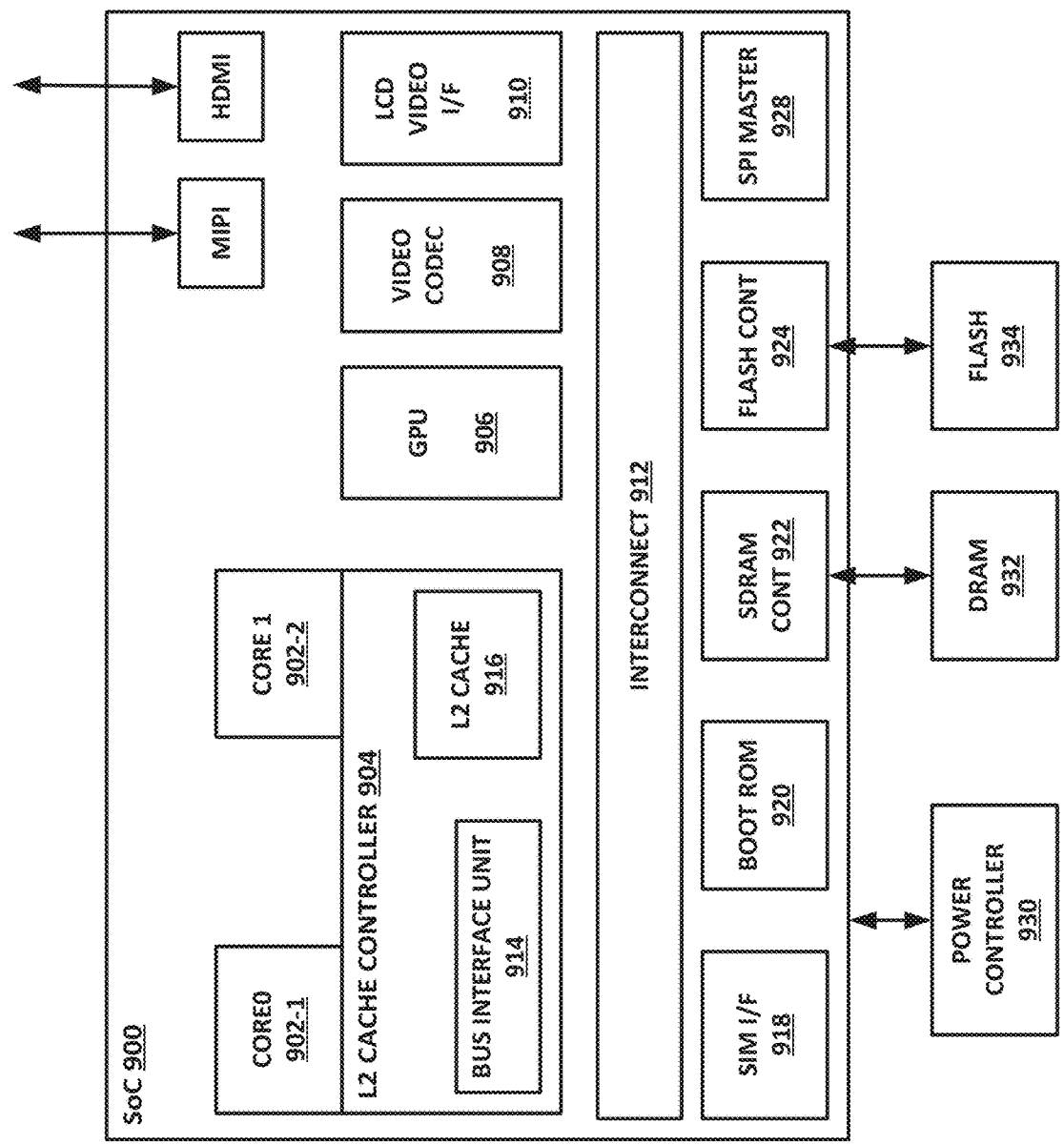
FIG. 9 is a block diagram of selected elements of a system-on-a-chip (SoC).

FIG. 9 is a block illustrating selected elements of an example system-on-a-chip (SoC) 900. In at least some embodiments, SoC 900 may be configured or adapted to provide explainability of an unsupervised learning algorithm outcome, and may also implement any of the algorithms disclosed herein.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902-1 and 902-2. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) master 928, a suitable power control 930, a dynamic RAM (DRAM) 932, and flash 934. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 900 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. In at least some embodiments, processor 1000 may be configured or adapted to provide explainability of an unsupervised learning algorithm outcome, and may also implement any of the algorithms disclosed herein.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via network function virtualization (NFV), and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VMs) are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Memory 1040 may include executable instructions 1042, as illustrated. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

Figure 11:
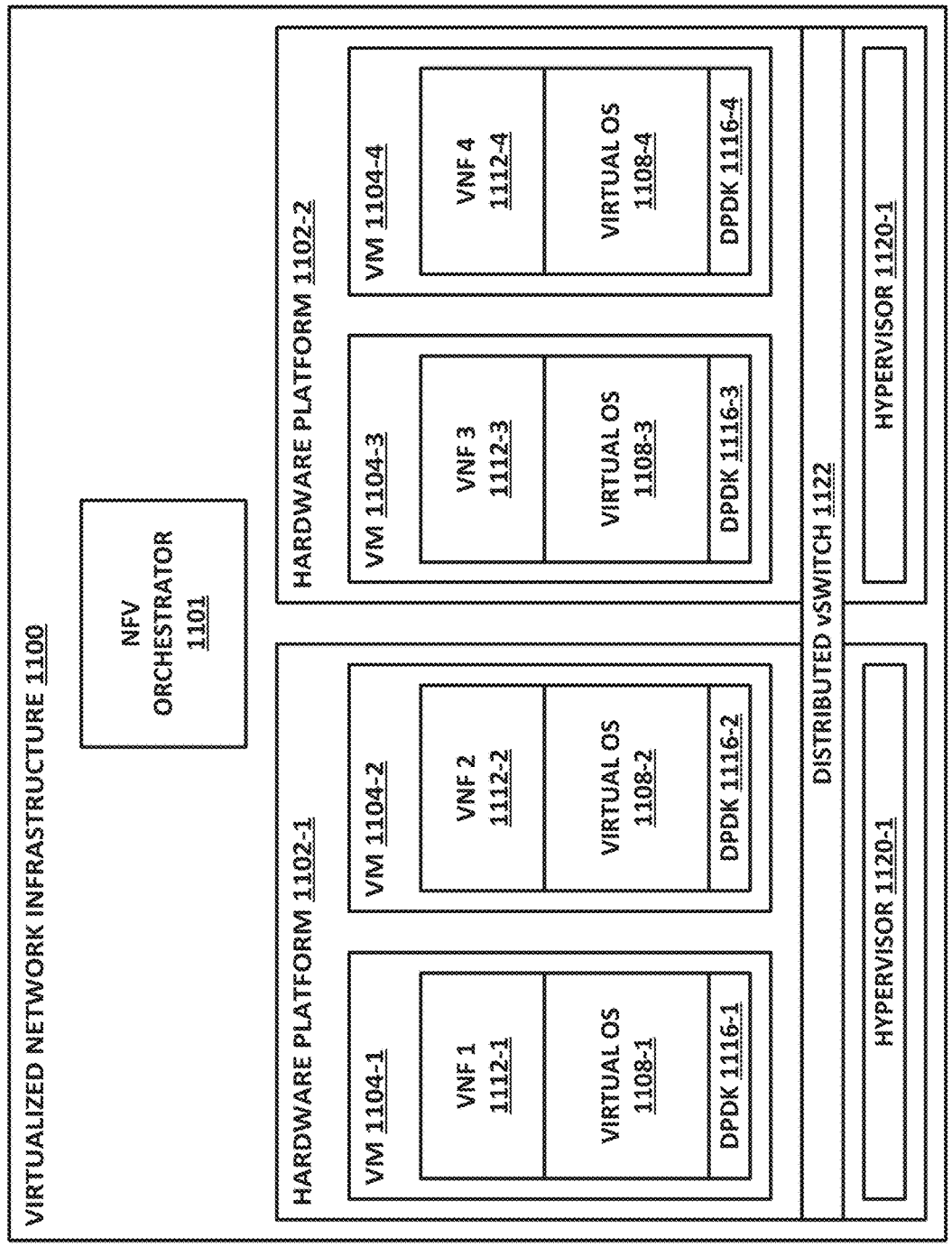
FIG. 11 is a block diagram of selected elements of a network function virtualization (NFV) infrastructure.

FIG. 11 is a block diagram of a network function virtualization (NFV) infrastructure 1100. In at least some embodiments, explainability of an unsupervised learning algorithm outcome, as well as any of the algorithms disclosed in the present specification, may be implemented within NFV infrastructure 1100.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or runtime memory (e.g., RAM), where instructions have already been loaded. These instructions, when fetched by the processor and executed, may provide methods or procedures as described herein.

In yet another embodiment, there may be one or more tangible, non-transitory computer readable storage media having stored thereon executable instructions that, when executed, cause a hardware platform or other computing system, to carry out a method or procedure. For example, the instructions could be executable object code, including software instructions executable by a processor. The one or more tangible, non-transitory computer readable storage media could include, by way of illustrative and nonlimiting example, a magnetic media (e.g., hard drive), a flash memory, a ROM, optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example a malware analysis server, comprising: a hardware platform comprising a processor and a memory; a machine learning model; a store of known objects previously classified by the machine learning model; and instructions encoded within the memory to instruct the processor to: receive a test sample; apply the machine learning model to the test sample to provide the test sample with classified features; compute pairwise distances between the test sample and a set of known objects from the store of known objects; select a group of near neighbor samples from the set of known objects; select a group of far neighbor samples from the set of known objects; and generate an explanation for the test sample according to the near neighbor samples and far neighbor samples.

There is further disclosed an example malware analysis server, wherein the machine learning model is unsupervised.

There is further disclosed an example malware analysis server, wherein the hardware platform is a disaggregated hardware platform.

There is further disclosed an example malware analysis server, further comprising a virtualization or containerization layer.

There is further disclosed an example malware analysis server, wherein selecting the group of near neighbor samples comprises computing a minimum match threshold on one or more features.

There is further disclosed an example malware analysis server, wherein selecting the group of far neighbor samples comprises computing a maximum match threshold on one or more features.

There is further disclosed an example malware analysis server, wherein selecting the group of near neighbor or far neighbor samples comprises computing a composite distance from a plurality of features.

There is further disclosed an example malware analysis server, wherein selecting the group of near neighbor samples comprises selecting samples in a same cluster as the test sample.

There is further disclosed an example malware analysis server, wherein the cluster is part of a first supercluster.

There is further disclosed an example malware analysis server, wherein selecting the group of far neighbor samples comprises selecting samples from one or more superclusters different from the first supercluster.

There is further disclosed an example malware analysis server, wherein selecting the group of far neighbor samples comprises selecting samples from one or more other clusters within the first supercluster.

There is further disclosed an example malware analysis server, wherein selecting the group of near neighbor samples or far neighbor samples comprises applying an exact match rule.

There is further disclosed an example malware analysis server, wherein selecting the group of near neighbor samples or far neighbor samples comprises applying an approximate match rule.

There is further disclosed an example malware analysis server, wherein selecting the group of near neighbor samples or far neighbor samples comprises computing a pairwise aggregate match score based on a combination of exact match features and approximate match features.

There is further disclosed an example malware analysis server, wherein computing the pairwise aggregate match score comprises weighting features.

There is further disclosed an example malware analysis server, wherein the instructions are further to instruct the processor to generate a report comprising a meaning group explanation.

There is further disclosed an example malware analysis server, wherein the meaning group explanation comprises a very similar category with an explanation of very similar features.

There is further disclosed an example malware analysis server, wherein the meaning group explanation comprises a very dissimilar category with an explanation of very dissimilar features.

There is further disclosed an example malware analysis server, wherein generating the report comprises comparing additional features of the test sample to additional features of the near neighbor samples and far neighbor samples, wherein the additional features include features not used in selecting the near neighbor samples and far neighbor samples.

There is also disclosed an example of one or more tangible, non-transitory computer readable storage media having stored thereon executable instructions to instruct a processor to: analyze a test sample via an unsupervised machine learning model; compute pairwise distances to select a set of near neighbors from a set of known objects according to similar features; compute pairwise distances to select a set of far neighbors from the set of known objects according to dissimilar features; and generate a meaning group explanation report from the near neighbors and far neighbors.

There is further disclosed an example of one or more tangible, non-transitory computer readable storage media, wherein the instructions are to operate on a disaggregated hardware platform.

There is further disclosed an example of one or more tangible, non-transitory computer readable storage media, wherein the instructions are further to provide a virtualization or containerization layer.

There is further disclosed an example of one or more tangible, non-transitory computer readable storage media, wherein selecting the set of near neighbors further comprises computing a minimum match threshold on one or more features.

There is further disclosed an example of one or more tangible, non-transitory computer readable storage media, wherein selecting the set of far neighbors further comprises computing a maximum match threshold on one or more features.

There is further disclosed an example of one or more tangible, non-transitory computer readable storage media, wherein selecting the set of near neighbors or far neighbors further comprises computing a composite distance from a plurality of features.

There is further disclosed an example of one or more tangible, non-transitory computer readable storage media, wherein selecting the set of near neighbors comprises selecting near neighbors in a same cluster as the test sample.

There is further disclosed an example of one or more tangible, non-transitory computer readable storage media, wherein the cluster is part of a first supercluster.

There is further disclosed an example of one or more tangible, non-transitory computer readable storage media, wherein selecting the set of far neighbors comprises selecting far neighbors from one or more superclusters different from the first supercluster.

There is further disclosed an example of one or more tangible, non-transitory computer readable storage media, wherein selecting the set of far neighbors comprises selecting far neighbors from one or more other clusters within the first supercluster.

There is further disclosed an example of one or more tangible, non-transitory computer readable storage media, wherein selecting the set of near neighbors or far neighbors comprises applying an exact match rule.

There is further disclosed an example of one or more tangible, non-transitory computer readable storage media, wherein selecting the set of near neighbors or far neighbors comprises applying an approximate match rule.

There is further disclosed an example of one or more tangible, non-transitory computer readable storage media, wherein selecting the set of near neighbors or far neighbors further comprises computing a pairwise aggregate match score based on a combination of exact match features and approximate match features.

There is further disclosed an example of one or more tangible, non-transitory computer readable storage media, wherein computing the pairwise aggregate match score comprises weighting features.

There is further disclosed an example of one or more tangible, non-transitory computer readable storage media, wherein the instructions are further to instruct the processor to generate a report comprising a meaning group explanation.

There is further disclosed an example of one or more tangible, non-transitory computer readable storage media, wherein the meaning group explanation comprises a very similar category with an explanation of very similar features.

There is further disclosed an example of one or more tangible, non-transitory computer readable storage media, wherein the meaning group explanation comprises a very dissimilar category with an explanation of very dissimilar features.

There is further disclosed an example of one or more tangible, non-transitory computer readable storage media, wherein generating the report comprises comparing additional features of the test sample to additional features of the near neighbors and far neighbors, wherein the additional features include features not used in selecting the near neighbors and far neighbors.

There is also disclosed an example computer-implemented method of analyzing a binary test sample object via comparison to known objects, comprising: analyzing the test sample via machine learning to classify the test sample; comparing the test sample to a large set of known objects comprising computing pairwise feature distances between the test sample and the known objects; selecting a set of near neighbor objects according to a minimum threshold for pairwise feature distance; selecting a set of far neighbor objects according to a maximum threshold for pairwise feature distance; and generating a human-readable explainability report for the classification, including comparison with the near neighbor objects and contrast with the far neighbor objects.

There is further disclosed an example method, wherein classifying the test sample further comprises analyzing the test sample according to an unsupervised machine learning model.

There is further disclosed an example method, wherein the method is implemented within a virtualization or containerization layer.

There is further disclosed an example method, wherein selecting the set of near neighbor objects further comprises computing a minimum match threshold on one or more features.

There is further disclosed an example method, wherein selecting the set of far neighbor objects further comprises computing a maximum match threshold on one or more features.

There is further disclosed an example method, wherein selecting the set of near neighbor or far neighbor objects further comprises computing a composite distance from a plurality of features.

There is further disclosed an example method, wherein selecting the set of near neighbor objects further comprises selecting samples in a same cluster as the test sample.

There is further disclosed an example method, wherein the cluster is part of a first supercluster.

There is further disclosed an example method, wherein selecting the set of far neighbor objects further comprises selecting samples from one or more superclusters different from the first supercluster.

There is further disclosed an example method, wherein selecting the set of far neighbor objects further comprises selecting samples from one or more other clusters within the first supercluster.

There is further disclosed an example method, wherein selecting the set of near neighbor objects or far neighbor objects further comprises applying an exact match rule.

There is further disclosed an example method, wherein selecting the set of near neighbor objects or far neighbor objects further comprises applying an approximate match rule.

There is further disclosed an example method, wherein selecting the set of near neighbor objects or far neighbor objects further comprises computing a pairwise aggregate match score based on a combination of exact match features and approximate match features.

There is further disclosed an example method, wherein computing the pairwise aggregate match score comprises weighting features.

There is further disclosed an example method, further comprising generating a report comprising a meaning group explanation.

There is further disclosed an example method, wherein the meaning group explanation comprises a very similar category with an explanation of very similar features.

There is further disclosed an example method, wherein the meaning group explanation comprises a very dissimilar category with an explanation of very dissimilar features.

There is further disclosed an example method, wherein generating the report comprises comparing additional features of the test sample to additional features of the near neighbor objects and far neighbor objects, wherein the additional features include features not used in selecting the near neighbor objects and far neighbor objects.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

What is claimed is:

1. A malware analysis server, comprising:
a hardware platform comprising a processor circuit and a memory;
a store of known objects previously classified by a machine learning (ML) model; and
instructions encoded within the memory to instruct the processor to:
receive a test sample;
apply the ML model to the test sample to provide the test sample with classified features;
compute pairwise distances between the test sample and a set of known objects from the store of known objects;
select a group of near neighbor samples from the set of known objects;
select a group of far neighbor samples from the set of known objects; and
generate an explanation for the test sample wherein the explanation indicates that the test sample is similar to the to the near neighbor samples and different from the far neighbor samples.

2. The malware analysis server of claim 1, wherein the machine learning model is unsupervised.

3. The malware analysis server of claim 1, wherein the hardware platform is a disaggregated hardware platform.

4. The malware analysis server of claim 1, further comprising a virtualization or containerization layer.

5. The malware analysis server of claim 1, wherein selecting the group of near neighbor samples comprises computing a minimum match threshold on one or more features.

6. The malware analysis server of claim 1, wherein selecting the group of far neighbor samples comprises computing a maximum match threshold on one or more features.

7. The malware analysis server of claim 1, wherein selecting the group of near neighbor or far neighbor samples comprises computing a composite distance from a plurality of features.

8. The malware analysis server of claim 1, wherein selecting the group of near neighbor samples comprises selecting samples in a same cluster as the test sample.

9. The malware analysis server of claim 8, wherein the cluster is part of a first supercluster.

10. The malware analysis server of claim 9, wherein selecting the group of far neighbor samples comprises selecting samples from one or more superclusters different from the first supercluster.

11. The malware analysis server of claim 9, wherein selecting the group of far neighbor samples comprises selecting samples from one or more other clusters within the first supercluster.

12. The malware analysis server of claim 1, wherein the instructions are further to instruct the processor to generate a report comprising a meaning group explanation.

13. One or more tangible, non-transitory computer readable storage media having stored thereon executable instructions to instruct a processor to:
analyze a test sample via an unsupervised machine learning (ML) model;
compute pairwise distances to select a set of near neighbors from a set of known objects according to similar features;
compute pairwise distances to select a set of far neighbors from the set of known objects according to dissimilar features; and
generate a meaning group explanation report from the near neighbors and far neighbors, wherein the meaning group explanation report indicates that the test sample is similar to the near neighbors and different from the far neighbors.

14. The one or more tangible, non-transitory computer readable storage media of claim 13, wherein selecting the set of near neighbors or far neighbors further comprises computing a pairwise aggregate match score based on a combination of exact match features and approximate match features.

15. The one or more tangible, non-transitory computer readable storage media of claim 14, wherein computing the pairwise aggregate match score comprises weighting features.

16. The one or more tangible, non-transitory computer readable storage media of claim 13, wherein the instructions are further to instruct the processor to generate a report comprising a meaning group explanation.

17. The one or more tangible, non-transitory computer readable storage media of claim 16, wherein the meaning group explanation comprises a very similar category with an explanation of very similar features.

18. The one or more tangible, non-transitory computer readable storage media of claim 16, wherein the meaning group explanation comprises a very dissimilar category with an explanation of very dissimilar features.

19. A computer-implemented method of analyzing a binary test sample object via comparison to known objects, comprising:
analyzing the test sample via machine learning to classify the test sample;

comparing the test sample to a large set of known objects comprising computing pairwise feature distances between the test sample and the known objects;

selecting a set of near neighbor objects according to a minimum threshold for pairwise feature distance;

selecting a set of far neighbor objects according to a maximum threshold for pairwise feature distance; and generating a human-readable explainability report for the classification, including indicating similarity to the near neighbor objects and difference from the far neighbor objects.

20. The method of claim 19, wherein classifying the test sample further comprises analyzing the test sample according to an unsupervised machine learning model.

* * * * *